United States Patent [19]

Takahashi et al.

[11] Patent Number: 5,328,762
[45] Date of Patent: Jul. 12, 1994

[54] READILY ADHESIVE POLYESTER FILM AND PROCESS FOR PREPARATION THEREOF

[75] Inventors: Teruo Takahashi, Hachioji; Sadayoshi Miura, Yamato; Tamaki Kanai, Machida, all of Japan

[73] Assignee: Teijin Limited, Osaka, Japan

[21] Appl. No.: 682,956

[22] Filed: Apr. 10, 1991

[30] Foreign Application Priority Data

Apr. 11, 1990 [JP] Japan .................................... 2-94159

[51] Int. Cl.$^5$ .............................................. C09J 7/02
[52] U.S. Cl. ..................................... 428/355; 428/480
[58] Field of Search ........................ 428/343, 480, 353

[56] References Cited

U.S. PATENT DOCUMENTS

| | | | |
|---|---|---|---|
| 3,843,481 | 10/1974 | Hoheisel | 161/190 |
| 3,983,301 | 9/1976 | Cook | 428/480 |
| 4,025,694 | 5/1977 | Pletcher | 428/480 |
| 4,098,935 | 7/1978 | Knudsen | 428/354 |
| 4,210,703 | 7/1980 | Scantlin | 428/480 |
| 4,315,047 | 2/1982 | Seabold | 428/344 |

FOREIGN PATENT DOCUMENTS

| | | |
|---|---|---|
| 0107468 | 5/1984 | European Pat. Off. . |
| 2121735 | 8/1972 | France . |
| 2162864 | 7/1973 | France . |
| 1353257 | 5/1974 | United Kingdom . |
| 1431583 | 4/1976 | United Kingdom . |

*Primary Examiner*—Jenna L. Davis
*Attorney, Agent, or Firm*—Wenderoth, Lind & Ponack

[57] ABSTRACT

A readily adhesive polyester film comprising a polyester film having provided on at least one surface thereof a readily adhesive thin layer (a primer layer) containing an aqueous phenoxy resin; and a process for preparation of a readily adhesive polyester film which comprises applying an aqueous coating containing an aqueous phenoxy resin on at least one surface of a polyester film before completion of crystalline orientation, and then subjecting the resulting film to drying, stretching and heating treatments to complete crystalline orientation of the film.

4 Claims, No Drawings

READILY ADHESIVE POLYESTER FILM AND PROCESS FOR PREPARATION THEREOF

BACKGROUND OF THE INVENTION

1. Field of the Invention

This invention relates to a readily adhesive polyester film and a process for preparation thereof, and relates more detailedly to a polyester film having an excellent adhesive property and excellent blocking resistance, useful as a base material of highly processed film articles such as, for example, magnetic tapes for audio, magnetic tapes for video, magnetic tapes for computer, floppy disks, X-ray photograph films, telephone cards, membranes and diazomicrofilms, and particularly magnetic recording media; and a process for preparation thereof.

2. Description of the Prior Art

It is known to melting extrude and then subject to film formation a thermoplastic polyester, for example, polyethylene terephthalate or its copolymer, polyethylene naphthalate or its copolymer, or a blend of one of them and another resin in a small rate, or the like. It is also known that the resulting biaxially stretched and thermofixed polyester film is superior to a film consisting of another resin in heat resistance, gas screening ability, electric characteristic and chemical resistance. However, since its surface is in the state of high crystalline orientation, it has a high cohesiveness and is thus poor in an adhesive property to paints, adhesives, inks, etc.

As methods for improvement of this adhesive property, there are known physical treatments such as, for example, corona treatment, treatment with ultraviolet ray, plasma treatment, Electron Beam treatment and flame treatment; and chemical treatments, for example, treatments with chemicals such as alkali, an aqueous amine solution, trichloroacetic acid and phenols. However, these methods have practically disadvantageous problems such as degradation of the adhesive force with time lapse and contamination of the working environment by volatilization of the chemicals.

As an alternative means, a method is known which comprises applying a readily adhesive paint onto the surface of polyester film in a process other than the usual film-forming step of the polyester film to provide thereon a primer layer. However, in this method, an organic solvent is usually used as the solvent in the paint and moreover it is hard to say that the coating atmosphere is sufficiently clean, and thus there are problems on safety and hygiene such as frequent occurrence of surface defects of processed commodities due to adhesion of dust and aggravation of the environment due to the organic solvents.

Incidentally, in case where this primer treatment is carried out during the film-forming steps of the polyester using an aqueous paint, there occurs no adhesion of dust in the clean environment and because of the aqueous solvent there is no fear of explosion and aggravation of the environment, and thus it is advantageous on the points of performance.

From such advantages, it has been proposed to use as a primer water soluble or water dispersible polyester reins or acrylic resins (Japanese Laid-Open Patent Publication No. 43017/1979, Japanese Patent Publication No. 10243/1974, Japanese Laid-Open Patent Publication Nos. 19786/1977 and 19787/1977, etc.). However, the above polyester resins have a disadvantage that when the resulting film is wound into rolls, it easily causes blocking, and the above acrylic resins have a disadvantage that they are sufficient in the adhesive property with the base film, mechanical strength and the adhesive property with the magnetic layer. For the purpose of improving these disadvantages, it has been proposed to use the above polyester resin and the above acrylic resin in mixing thereof (Japanese Laid-Open Patent Publication No. 124651/19.83), but it is hard to say that these disadvantages are sufficiently improved.

SUMMARY OF THE INVENTION

An object of the invention is to provide a readily adhesive polyester film having a primer layer having no tackiness and having an excellent adhesive property to various coated materials to be applied onto polyester film such as, for example, offset inks, rotogravure inks, silk screen inks, UV inks, magnetic paints, gelatin compositions, adhesive masses, toners for electrophotography, chemical mat paints, diazo paints, hard coat paints, UV paints, heat-sealing properties-given compositions and inorganic film-forming substances, particularly magnetic paints.

Another object of the invention is to provide a method suitable for preparation of such readily adhesive polyester films.

According to the invention, such objects of the invention can be attained by a readily adhesive polyester film comprising a polyester film having provided on at least one surface thereof a readily adhesive thin layer (primer layer) containing an aqueous phenoxy resin.

Further, such objects of the invention can be attained, according to the invention, by a process for preparation of a readily adhesive polyester film which comprises applying an aqueous coating containing an aqueous phenoxy resin on at least one surface of a polyester film before completion of crystalline orientation, and then subjecting the resulting film to drying, stretching and heating treatments to complete crystalline orientation of the film.

DETAILED DESCRIPTION OF THE PREFERRED EMBODIMENTS:

In this invention, the polyester composing the polyester film is a linear saturated polyester synthesized from an aromatic dibasic acid or its ester-forming derivative with an aliphatic diol having 2 to 10 carbon atoms or its ester-forming derivative, and known as it is. As specific examples of such polyesters, there can be exemplified polyethylene terephthalate, polyethylene isophthalate, polybutylene terephthalate, poly (1,4-cyclohexylenedimethylene terephthalate), polyethylene 2,6-naphthalenedicarboxylate, etc., and copolymers thereof or blends of them with other resins in a small rate are also included therein.

The polyester film of the invention is obtained by melting extruding such a linear saturated polyester, forming the extrudate into a nonoriented film according to a conventional manner, and orientation crystallizing and then crystallizing with heat treatment the film. Preferred as this polyester film is one crystal-oriented to such an extent that the value of the fusion heat of its crystals measured by a differential assessment type calorimeter in a stream of nitrogen (in a temperature increase velocity of 10° C./min.) becomes usually 4 cal/g or more.

In the invention, the polyester films before completion of crystalline orientation include a non-stretched (nonoriented) film obtained by heat melting the polymer and forming the melted polymer as it is into a film; a monoaxially stretched film obtained by orienting such a nonstretched film in the direction of any one of the longitudinal direction and the horizontal (transverse) direction; a film obtained by stretching in a low magnification and orienting such a nonstretched film in the two directions of the longitudinal direction and the horizontal direction (i.e., a biaxially stretched film before completion of oriented crystallization by final longitudinal or horizontal restretching); etc.

The aqueous coating (an aqueous primer liquid) is an aqueous dispersion or solution containing an aqueous phenoxy resin.

This aqueous phenoxy resin required to be completely dissolved at room temperature in the aqueous medium (wherein an organic solvent may be contained in an amount of 50% or less (preferably 30% or less)), or to be dispersed into the aqueous medium as fine particles having an average particle size of 0.5 μm or less (preferably 0.3 μm or less).

This aqueous phenoxy resin is a linear polymer containing as the main component a repeating unit of the following formula

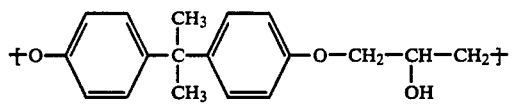

The aqueous phenoxy resin substantially consisting of this repeating unit can be obtained by the condensation reaction of bisphenol A and epichlorohydrine.

As a process for preparation of an aqueous liquid using this aqueous phenoxy resin, there can preferably mentioned a process which comprises (1) dissolving the phenoxy resin in an organic solvent such as, for example, ethyl cellosolve, butyl cellosolve, diacetone alcohol, cyclohexanone, dioxane, methanol, ethanol, isopropyl alcohol (IPA), tetrahydrofuran (THF), methyl ethyl ketone (MEK) or acetone, (2) either admixing the resulting solution with 0.1 to 20% by weight of a surfactant based on the aqueous phenoxy resin and then dispersing the mixture in water, or admixing the solution with water dissolving the above amount of the surfactant to give a dispersion, and (3) then on some occasion distilling away the organic solvent by distillation.

As another process for dispersing an aqueous phenoxy resin in water, there is a process wherein into a phenoxy resin is introduced a water dispersible functional group such as, for example, a carboxylate salt group, a sulfonate salt group or a sulfate half ester salt group. As specific examples of this preparation process, there can, for example, be mentioned a process which comprises polycondensing part of an aqueous phenoxy resin as a raw material with a raw material for giving self-emulsifiability such as, for example, sulfonated bisphenol A or carboxylated bisphenol A, neutralizing the resulting reaction mixture with an amine such as triethylamine or dimethylethanolamine and/or an alkali (alkaline earth) ion such as Li, Na, K or Ca, and then dispersing the resulting reaction mixture into water; a process which comprises condensing part of an aqueous phenoxy resin as a raw material with an adduct of bisphenol A with ethylene oxide, and then dispersing the reaction mixture into water; or a process which comprises making a sulfonating agent such as a chlorosulfonic acid act on a phenoxy resin after polymerization, neutralizing the reaction mixture with an amine or the like, and then self-emulsifying the resulting reaction product into water. As still another process, there can be mentioned a process wherein self-emulsifiability is given utilizing hydroxyl groups at the side chains of a phenoxy resin, for example, a process wherein self-emulsifiability is given by reacting the hydroxyl groups with sodium 3-carboxybenzenesulfonate or the like, or a process which comprises dissolving a phenoxy resin in an organic solvent, adding thereto an acrylic or vinyl monomer containing a carboxylate salt group or sulfonate salt group, carrying out polymerization to prepare a solution of a graft polymer whose main chain is a phenoxy resin and wherein the acrylic or vinyl polymers are tabularly linked thereto, and then adding water to desolvate the solution and water-disperse the polymer.

Preferably, the introduction amount of a self-emulsifiable functional group into the aqueous phenoxy resin is $3 \times 10^{-5}$ to $3 \times 10^{-3}$ eq/g, particularly $1 \times 10^{-4}$ to $1 \times 10^{-3}$ eq/g.

Further, the molecular weight of the aqueous phenoxy resin is preferably 8,000 to 300,000, particularly 10,000 to 100,000.

The aqueous coating in the invention is one which contains the above aqueous phenoxy resin, and wherein the resin is dissolved or dispersed in an aqueous medium. This aqueous coating can contain a small amount of an organic solvent.

The above aqueous coating can contain a surfactant such as an anionic sulfactant, a cationic surfactant or a nonionic surfactant added in a necessary amount. Preferred as such surfactants are those which can lower the surface tension of the aqueous coating up to 40 dyne/cm or less and promote wetting to the polyester film, and examples thereof include polyoxyethylene alkyl phenyl ethers, polyoxyethylene fatty acid esters, sorbitan fatty acid esters, glycerol fatty acid esters, fatty acid metallic soaps, alkyl sulfate salts, alkylsulfonates, alkylsulfosuccinic acid salts, quaternary ammonium chloride salts, alkylamine hydrochlorides, etc. Further, within such a range that the effects of the invention are not disappeared, there can be admixed other additives such as, for example, an antistatic agent, an ultraviolet absorber, a pigment, an organic filler, an inorganic filer, a lubricant and a blocking inhibitor.

Application of the aqueous coating onto the polyester film can be carried out according to a usual coating step, i.e. according to a step wherein the biaxially stretched and thermofixed polyester film is coated, apart from the preparation step of the film. However, in this step dust, dirt and the like are apt to mix, and thus coating in a clean atmosphere is desirable for those for commodities of high order such as magnetic tapes and floppy disks. From such viewpoint, coating during the preparation step of the polyester film is preferred. Particularly, it is preferred to apply the aqueous coating onto one surface or both surfaces of the polyester film before crystalline orientation is completed in this step. The concentration of the solid components in the aqueous coating is usually 0.5% by weight or more and 30% by weight or less, further preferably 10% by weight or less. The application amount is preferably 0.5 to 20 g, more preferably 0.5 to 10 g, particularly 1 to 10 g on the basis of wet weight per m² of the traveling film. Further, such an amount is preferred that the thickness of the primer thin layer on the surface of the film after the biaxial stretching and thermofixing becomes 0.001 to 1 g/m², particularly 0.01 to 0.3 g/m² on the basis of dry weight.

As for coating methods, known optional coating methods can be used. For example, the roll coating method, the gravure coating method, the roll brashing method, the spray coating method, the air-knife coating method, the dipping method and the curtain coating method and the like can be utilized alone or in combination.

The polyester film before completion of crystalline orientation coated with the aqueous coating is introduced into steps such as stretching and thermofixing. For example, the longitudinally monoaxially stretched polyester film, which was coated with the aqueous coating, is introduced into a stenter, where the film is then horizontally stretched and thermofixed. In the meanwhile the coating is dried and a continuous coat is formed on the film. Drying is conveniently carried out before stretching or during stretching.

The conditions for oriented crystallization of the polyester film, for example conditions for stretching, thermofixing, etc. thereof can be conditions so far accumulated in the industry.

The thus obtained polyester film having a primer layer exhibits a high adhesive property to extremely comprehensive paints such as inks for cellophane, magnetic paints, gelatin compositions, toner compositions for electrophotography, paints for chemical mats, diazo paints and UV inks, and a strong adhesive property particularly to magnetic paints; has no tackiness; and exhibits a good blocking resistance.

Examples

This invention is further described below according to examples.

"Part" in examples means "weight part". Further, each characteristic of the film was determined by the following corresponding methods.

1. Adhesive Property

A paint to be assessed is applied onto a sample film (polyester film) by a Mayer bar so that the thickness after drying becomes about 4 μm, followed by drying at 100° C. for 3 minutes. Thereafter, aging is carried at 60° C. for 24 hours, Scotch tape No. 600 (produced by 3M Co.) 12.7 mm wide and 15 cm long is stuck thereon so that bubbles does not enter, the dried paint is made to adhere by smoothing it with a manual loading roller as described in JIS C 2701 (1975), applied on the tape, and then the resulting construct is cut out in the tape width. Strength when the cut construct is subjected to peeling is measured.

Paint for Assessment

In terms of solid components,
1 Urethane resin Nipporane 2304 25 parts (produced by Nihon Polyurethane Co., Ltd.)
2 Vinyl chloride - vinyl acetate resin 50 parts Esrec A (produced by Sekisui Chemical Co., Ltd.)
3 Dispersing agent Lesion P 1 part (produced by Riken Vitamin Co., Ltd.)
4 Magnetic material CTX-860 500 parts (produced by Toda Chemical Co., Ltd.)

The above components are added to a mixed solvent consisting of MEK/toluene/cyclohexanone to 40% concentration, and dispersed therein for 2 hours by a sand grinder. Thereafter, 25 parts in terms of the solid components of a crosslinking agent Koronate L is added, and the mixture is sufficiently stirred to obtain a magnetic paint.

2. Blocking Property

The surface and back of two sample films (polyester film) contact with together, the resulting film is cut into 10 cm×15 cm square, 50 kg/cm² of load is given thereto for 17 hours in an atmosphere of 50° C. x 50% RH, and then peeling strength is measured on this 10 cm width. Peeling speed at the time is 100 mm/min.

EXAMPLE 1

100 parts of an aqueous phenoxy resin having molecular weight of about 20,000 was dissolved in 1000 part of THF, 15 parts of a nonion surfactant (HLB; 12.8) was added, and the mixture was gradually added into warm water of 50° C. stirred by a high speed dispersing machine to obtain an aqueous phenoxy resin solution. Water was added to this solution to obtain an aqueous cotaing having a solid components concentration of 4 wt. % (an aqueous primer liquid).

Polyethylene terephthalate (containing an inert fine particles) whose intrinsic viscosity measured in o-chlorophenol of 25° C. is 0.65 was melting extruded on a rotating cooling drum maintained at 20° C. to give a nonstretched film 100 μm thick, and after the film was stretched in the direction of the mechanical axis 3.5-fold, the above aqueous primer liquid was applied onto one side of the monoaxially stretched film according to the kiss coating method. Succeedingly, the resulting film was 3.9-fold stretched transversely at 105° C. and heat treated at 210° C. to give a biaxially oriented polyester film 10 μm thick, one side of which was coated with the primer. The average application amount at the time was 50 mg/m² in terms of the solid components.

Characteristics of this film are shown in Table 1.

EXAMPLE 2

After synthesis of 100 parts of an aqueous phenoxy resin having a molecular weight of about 50,000 wherein the molar ratio of the starting materials, bisphenol A to sulfonated bisphenol A is 99:1, 8 parts of dimethylethanolamine was added. The resulting solution was gradually added to warm water of 80° C. in a state stirred at a high speed to give an aqueous phenoxy resin solution.

An anionic surfactant was added to this aqueous phenoxy solution to give an aqueous primer solution having a solid components concentration of 2 wt. %.

Thereafter, utterly the same operations as in Example 1 were carried out to give a biaxially oriented polyester film whose one side was coated with the primer.

Characteristics of this film are shown in Table 1.

EXAMPLE 3

The primer solution of Example 1 was applied on both sides of the polyester film after longitudinal stretching, which was then biaxially stretched and thermofixed, and finally a biaxially oriented polyester film 75 μm thick coated with the primer was obtained.

Characteristics of this film are shown in Table 1.

EXAMPLE 4

94.8 parts of a phenoxy resin having a moelcular weight of about 30,000 was dissolved in 400 parts of methyl ethyl ketone, 5 parts of methacrylic acid and 0.2 part of a radical catalyst were added, and the mixture was heated to 70° C. and held at the temperature for 8 hours to carry out radical polymerization. 2400 parts of water was then added under high speed stirring, desolvation was carried out with heating, followed by adjustment to pH 8 with ammonia water. Thereafter, 10 parts of the nonionic surfactant used in Example 1 and 240 parts of water were added to obtain an aqueous coating having a solid components concentration of 4 wt. %.

Thereafter, the same procedure as in Example 1 was carried out except for using this aqueous coating to obtain prime-coated biaxially oriented polyester film.

Characteristics of this film is shown in Table 1.

COMPARATIVE EXAMPLES 1 AND 2

For comparison were obtained biaxially oriented polyethylene terephthalate films having a thickness of 10 μm and 75 μm, respectively, which were not coated with the primer solution.

Characteristics of these films are shown in Table 1.

COMPARATIVE EXAMPLE 3

Utterly the same procedures as in Example 1 were carried out except that Hydran HW-100 (produced by DAINIPPON INK AND CHEMICALS, INCORPORATED)/a noninoic surfactant=85/15 (weight ratio in terms of the solid components) was used as a primer solution, whereby a biaxially oriented polyester film coated with the primer was obtained.

Characteristics of this film are shown in Table 1.

COMPARATIVE EXAMPLES 4 AND 5

4 parts of the nonionic surfactant used in Example 1 and 906 parts of water were added to 90 parts of an aqueous dispersion (solid components concentration 40%) of the acrylic polymer of methyl methacrylate/ethyl acrylate/2-hydroxyethyl methacrylate/sodium acrylate=63/34/2/1 (mol %) under stirring to obtain an aqueous coating having a solid components concentration of 4 wt. %.

Separately, 4 parts of the nonionic surfactant used in Example 1 and 816 parts of water were added to 180 parts of an aqueous dispersion (solid components concentration 40%) of the copolymerized polyester of terephthalic acid/sodium isophthalic acid-5-sulfonate/ethylene glycol/diethylene glycol=90/10/80/20 (mol %) under stirring to obtain an aqueous coating having a solid components concentration of 4 wt. %.

The same procedure as in Example 1 was carried out except for using these two aqueous coatings, respectively to obtain primer-coated biaxially oriented polyester films.

Characteristics of these films are shown in Table 1.

TABLE 1

|   | Adhesive force (g/12.7 mm) | Blocking property (g/10 cm) |
|---|---|---|
| Example 1 | 40 | 0 |
| Example 2 | 50 | 0 |
| Example 3 | 70 | 1 |
| Comparative Example 1 | 10 | 0 |
| Comparative Example 2 | 18 | 0 |
| Comparative Example 3 | 60 | Rupture |
| Example 4 | 44 | 3 |
| Comparative Example 4 | 20 | 3 |
| Comparative Example 5 | 55 | Rupture |

As apparent from Table 1, the polyester films of the examples exhibit excellent properties in the adhesive property to the magnetic paint and the blocking property.

We claim:

1. A readily adhesive polyester film comprising a polyester film having provided on at least one surface thereof a thin layer readily adhesive to magnetic paints containing a self-emulsifiable type aqueous phenoxy resin which contains $3\times10^{-5}$ to $3\times10^{-3}$ eq/g of self-emulsifiable functional group, said aqueous phenoxy resin being a linear polymer containing as the main component a repeating unit of the following formula

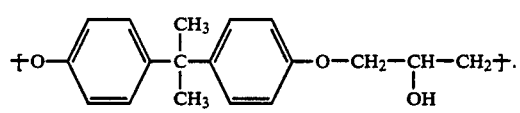

2. The readily adhesive polyester film of claim 1 wherein the molecular weight of the aqueous phenoxy resin is 8,000 to 300,000.

3. The readily adhesive polyester film of claim 1 wherein the weight of the readily adhesive thin layer is 0.001 to 1 g/m².

4. The readily adhesive polyester film of claim 1 wherein the polyester film is a film containing as the main component polyethylene terephthalate.

* * * * *